US010661313B2

(12) United States Patent
Stockert et al.

(10) Patent No.: US 10,661,313 B2
(45) Date of Patent: May 26, 2020

(54) MULTI-TOOL PART CLEANING MACHINE

(71) Applicant: Fives Cinetic Corp., Farmington Hills, MI (US)

(72) Inventors: David L. Stockert, New Boston, MI (US); Scott A. Miller, Davison, MI (US); Kenneth Carmack, Howell, MI (US)

(73) Assignee: Fives Cinetic Corp., Farmington Hills, MI (US)

( * ) Notice: Subject to any disclaimer, the term of this patent is extended or adjusted under 35 U.S.C. 154(b) by 227 days.

(21) Appl. No.: 15/715,231

(22) Filed: Sep. 26, 2017

(65) Prior Publication Data

US 2018/0185887 A1 Jul. 5, 2018

Related U.S. Application Data

(60) Provisional application No. 62/442,474, filed on Jan. 5, 2017.

(51) Int. Cl.
| | | |
|---|---|---|
| *B23Q 1/48* | (2006.01) | |
| *B08B 3/08* | (2006.01) | |
| *B23Q 11/00* | (2006.01) | |
| *B23Q 1/62* | (2006.01) | |
| *B23Q 3/155* | (2006.01) | |

(52) U.S. Cl.
CPC .............. *B08B 3/08* (2013.01); *B23Q 1/4857* (2013.01); *B23Q 1/621* (2013.01); *B23Q 11/0075* (2013.01); *B23Q 2003/15537* (2016.11); *B23Q 2230/002* (2013.01)

(58) Field of Classification Search
CPC .................................................. B23Q 1/4857
See application file for complete search history.

(56) References Cited

U.S. PATENT DOCUMENTS

2012/0266783 A1* 10/2012 Yoshida .............. B23Q 1/4857
   108/2
2013/0032012 A1* 2/2013 Baumann ................ B23B 3/168
   82/121
2016/0221118 A1* 8/2016 Yamashita .............. B23P 23/04

FOREIGN PATENT DOCUMENTS

| EP | 1201351 A2 | 5/2002 |
| EP | 1882544 A1 | 1/2008 |
| GB | 2496869 A | 5/2013 |
| JP | 2015217492 A | 12/2015 |

* cited by examiner

*Primary Examiner* — Jason Y Ko
(74) *Attorney, Agent, or Firm* — Quinn IP Law (57) ABSTRACT

A part cleaning machine includes a cradle moveable along an X axis, and rotatable about a first cradle axis. A part holder is attached to the cradle, and is rotatable about a second cradle axis. A chuck holder is moveable on a tool positioning plane that is perpendicular to the X axis. A tool chuck is attached to and moveable with the chuck holder. A tool holder is moveable relative to the chuck holder along the X axis. A plurality of tools are releasably attached to the tool holder for selective attachment to the tool chuck. A machine controller is operable to control movement of the chuck holder, the tool chuck, and the tool holder to transfer a selected one of the tools between the tool chuck and the tool holder, and position an appropriate tool and the part in different positions for several different cleaning operations.

28 Claims, 7 Drawing Sheets

MULTI-TOOL PART CLEANING MACHINE

CROSS-REFERENCE TO RELATED APPLICATIONS

This application claims the benefit of U.S. Provisional Patent Application Ser. No. 62/442,474, filed on Jan. 5, 2017, the disclosure of which is hereby incorporated by reference.

TECHNICAL FIELD

The disclosure generally relates to a part cleaning machine for cleaning a part.

BACKGROUND

Many parts, including but not limited to engine blocks, cylinder heads, manifolds, housings, etc., require one or more different cleaning operations be performed during their manufacture in preparation for installation. For example, an engine block may have many different ports, passages, galleries, etc., which must have several different cleaning operations performed on each. The different cleaning operations may include, but are not limited to, deburring, washing, flushing, drying, etc. Each of these different cleaning operations may require a specialized tool for performing a specific cleaning operation in a specific location of the part. The specialized tools may include, but are not limited to, several different shape and configurations of a nozzle, lances, brushes, manifolds, spin jets, or seal and flush devices.

When a part requires multiple different cleaning operations, with each different cleaning operation requiring a different cleaning tool, an assembly line process is set up with several different stations. Each station is equipped with a specific cleaning tool for performing a specific cleaning operation. The part is moved from one station to the next to complete all of the different required cleaning operations.

SUMMARY

A part cleaning machine is provided. The part cleaning machine includes a support structure. A cradle is attached to the support structure. The cradle is moveable relative to the support structure along an X axis, and is rotatable relative to the support structure about a first cradle axis. The X axis and the first cradle axis are perpendicular to each other. A part holder is attached to the cradle. The part holder is rotatable about a second cradle axis relative to the cradle. The first cradle axis and the second cradle axis are perpendicular to each other. A chuck holder is attached to the support structure. The chuck holder is moveable relative to the support structure along both a Y axis and a Z axis. The Y axis and the Z axis cooperate to form a tool positioning plane that is perpendicular to the X axis. A tool chuck is attached to and moveable with the chuck holder. A tool holder is attached to the support structure. The tool holder is moveable relative to the chuck holder along the X axis. A plurality of tools are releasably attached to the tool holder for selective attachment to the tool chuck. A machine controller is operatively connected to the chuck holder, the tool chuck, and the tool holder. The machine controller is operable to control the chuck holder, the tool chuck, and the tool holder to transfer a selected one of the plurality of tools between the tool chuck and the tool holder.

A method of operating a part cleaning machine is also provided. The method includes removably attaching a part to a part holder. A first one of a plurality of tools is selected for performing a desired cleaning operation. The selected first one of the plurality of tools is transferred from a tool holder to a tool chuck. The selected first one of the plurality of tools is positioned in a pre-defined tool cleaning position by moving a chuck holder along at least one of a Y axis and a Z axis on a tool positioning plane. The part is positioned in a pre-defined part cleaning position by at least one of moving a cradle along an X axis, rotating the cradle about a first cradle axis, or rotating the part holder about a second cradle axis. The desired cleaning operation is performed on the part with the selected first one of the plurality of tools, with the part in the pre-defined part cleaning position and the selected first one of the plurality of tools in the pre-defined tool cleaning position.

Accordingly, the part cleaning machine may choose from several different tools for performing several different cleaning operations. As such, the part does not have to be moved between different stations for different cleaning operations requiring different cleaning tools.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the FIGS., and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, a part cleaning machine is generally shown at 20. The part cleaning machine 20 may be used to perform several different cleaning operations on a part 22. The part 22 may include, but is not limited to, any article of manufacture that requires a cleaning operation be performed on that part 22 for preparation for future assembly or other manufacturing processes. For example, the part 22 may include, but is not limited to, an engine block, a cylinder head, a manifold, or some cast or machined part 22. The part cleaning machine 20 is capable of performing several different cleaning operations, and may be programmed for cleaning several different parts 22. Accordingly, a single part cleaning machine 20 may perform several different cleaning operations on several different parts 22, without having to move the part 22 between different cleaning stations.

Figure 1:
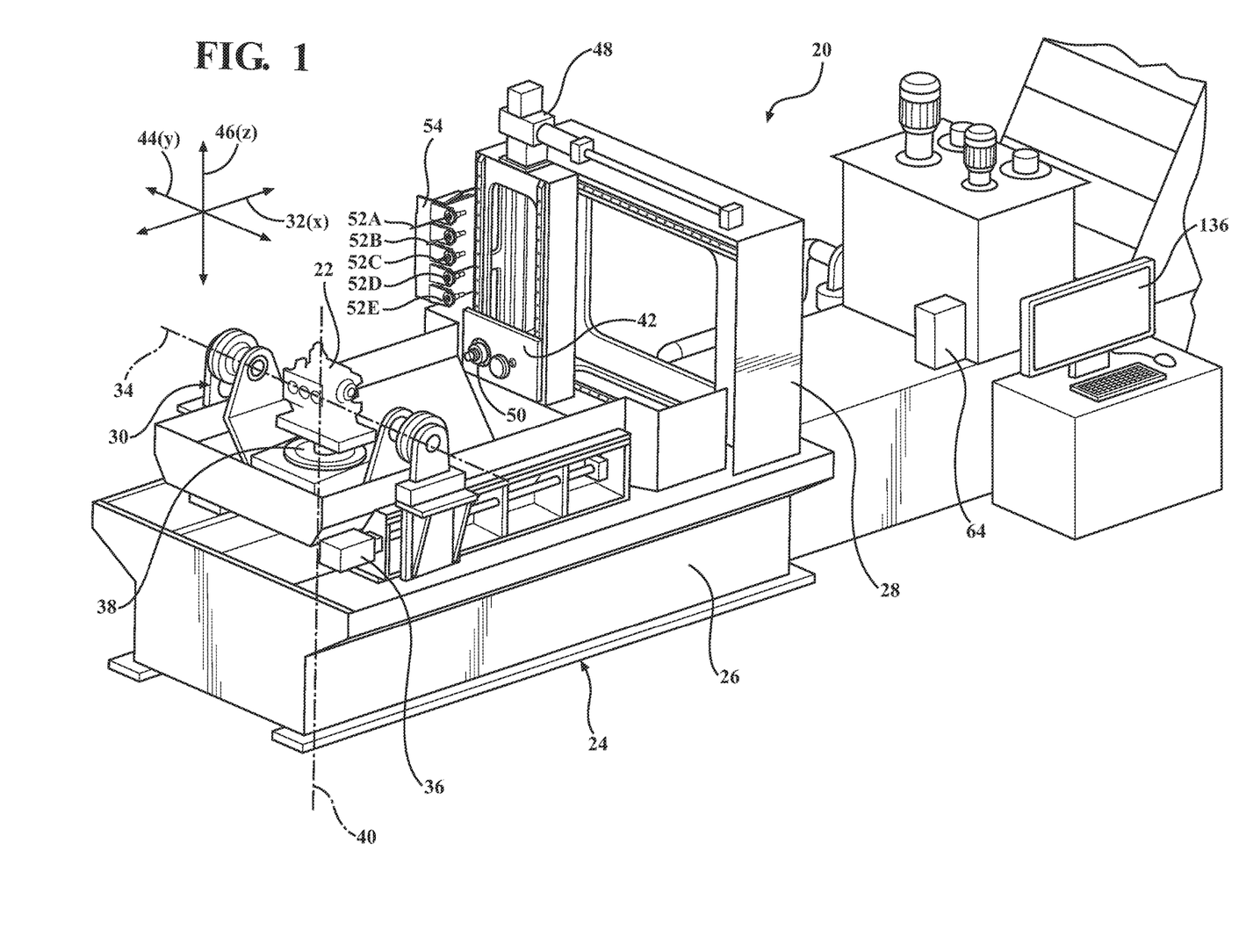
FIG. 1 is a schematic perspective view of a part cleaning machine.

Referring to FIG. 1, the part cleaning machine 20 includes a support structure 24. The support structure 24 may be configured in any suitable manner. The support structure 24 supports the various components of the part cleaning machine 20. As shown, the support structure 24 includes a lower portion 26 and an upper portion 28. The lower portion 26 is generally configured to rest on a surface, such as a floor, and support the components of the part cleaning machine 20. The lower portion 26 includes a generally horizontal structure. The upper portion 28 is generally configured as a vertical structure, which extends upward from the lower portion 26 of the support structure 24.

A cradle 30 is attached to the support structure 24. As shown, the cradle 30 is attached to the lower portion 26 of the support structure 24. The cradle 30 is moveable relative to the support structure 24 along an X axis 32, and is rotatable relative to the support structure 24 about a first cradle axis 34. The X axis 32 and the first cradle axis 34 are perpendicular to each other. The cradle 30 may be attached to the support structure 24 in any suitable manner that provides for or allows movement of the cradle 30 relative to the support structure 24 along the X axis 32. For example, the cradle 30 may be attached to the support structure 24 via one or more rails, rollers, etc. The specific manner in which the cradle 30 is attached to the support structure 24 is not pertinent to the teachings of this disclosure, and is therefore not described in detail herein.

A cradle drive system 36 is connected to the cradle 30, and is operable to move the cradle 30 back and forth along the X axis 32, and rotate the cradle 30 about the first cradle axis 34. The cradle drive system 36 may include any system capable of moving the cradle 30 back and forth along the X axis 32, relative to the support structure 24, as well as rotating the cradle 30 about the first cradle axis 34 relative to the support structure 24. The cradle drive system 36 may include, but is not limited to, an electric motor, hydraulics, pneumatics, etc., as well as all necessary linkages and connections required to connect the cradle drive system 36 and the cradle 30. The specific type and configuration of the cradle drive system 36 are not pertinent to the teachings of this disclosure, and are therefore not described in detail herein. The cradle 30 and the cradle drive system 36 may include any parts 22, connections, linkages, etc., necessary to attach and move the cradle 30 relative to the support structure 24, whether specifically mentioned herein or not.

Referring to FIG. 1, a part holder 38 is attached to the cradle 30. The part holder 38 is rotatable about a second cradle axis 40 relative to the cradle 30. The first cradle axis 34 and the second cradle axis 40 are perpendicular to each other. Accordingly, the part holder 38 may be rotated about the first cradle axis 34 by rotating the cradle 30 about the first cradle axis 34. Additionally, the part holder 38 may be rotated about the second cradle axis 40 relative to the cradle 30. It should be appreciated that the first cradle axis 34 and the second cradle axis 40 define a plane. Because the part holder 38 rotates with the cradle 30, the plane is rotatable about the first cradle axis 34. The first cradle axis 34 moves along the X axis 32 with the cradle 30, but remains perpendicular to the X axis 32 regardless of the position of the cradle 30 along the X axis 32. The second cradle axis 40 rotates with the cradle 30 about the first axis, such that the second cradle axis 40, and the plane defined by the first cradle axis 34 and the second cradle axis 40 rotate about the first cradle axis 34 with rotation of the cradle 30. The part holder 38 may be moved by a separate drive system, or may be linked to and moved by the cradle drive system 36.

The part holder 38 is configured for releasable attachment to the part 22. As such, the part holder 38 may be configured in any suitable manner for a specific shape or configuration of the part 22. The part 22 is attached to the part holder 38 prior to a cleaning operation, and is then released from the part holder 38 after the cleaning operation is complete. The part holder 38 secures the part 22 relative to the cradle 30 and the support structure 24. The part holder 38 may be releasably attachable to the cradle 30, such that multiple differently configured part holders 38 may be used with the part cleaning machine 20, to support a variety of different parts 22. In alternative embodiments, the part holder 38 may be permanently affixed to the cradle 30. The part holder 38 may be attached to the cradle 30 in any suitable manner that permits rotation of the part holder 38 about the second cradle axis 40 relative to the cradle 30. The specific manner in which the part holder 38 is attached to the cradle 30 is not pertinent to the teachings of this disclosure and are therefore not described in detail herein.

Referring to FIG. 1, a chuck holder 42 is attached to the support structure 24. As shown, the chuck holder 42 is attached to the upper portion 28 of the support structure 24. The chuck holder 42 is moveable relative to the support structure 24 along both a Y axis 44 and a Z axis 46, with the Y axis 44 and the Z axis 46 cooperating to form a tool 52 positioning plane that is perpendicular to the X axis 32. Accordingly, it should be appreciated that the X axis 32, the Y axis 44 and the Z axis 46 form the three axes of a Cartesian coordinate system. The Y axis 44 and the first cradle axis 34 are parallel with each other. Furthermore, it should be appreciated that the second cradle axis 40 may be positioned to be parallel with the Z axis 46. However, as the cradle 30 rotates about the first cradle axis 34, the second cradle axis 40 will rotate with the cradle 30, such that the second cradle axis 40 is not always parallel with the Z axis 46. The chuck holder 42 may be moveably attached to the support structure 24 in any suitable manner that provides for or allows movement of the chuck holder 42 relative to the support structure 24 along both the Y axis 44 and the Z axis 46. For example, the chuck holder 42 may be attached to the support structure 24 via one or more rails, rollers, etc. The specific manner in which the chuck holder 42 is attached to the support structure 24 is not pertinent to the teachings of this disclosure, and are therefore not described in detail herein.

A chuck drive system 48 is connected to the chuck holder 42, and is operable to move the chuck holder 42 back and forth along both the Y axis 44 and the Z axis 46. The chuck drive system 48 may include any system capable of moving the chuck holder 42 back and forth along the Y axis 44 and the Z axis 46, relative to the support structure 24. The chuck drive system 48 may include, but is not limited to, an electric motor, hydraulics, pneumatics, etc. The specific type and configuration of the chuck drive system 48 are not pertinent to the teachings of this disclosure, and are therefore not described in detail herein. The chuck holder 42 and the chuck drive system 48 may include any parts 22, connections, linkages, etc., necessary to attach and move the chuck holder 42 relative to the support structure 24, whether specifically mentioned herein or not.

Referring to FIG. 1, a tool chuck 50 is attached to and moveable with the chuck holder 42. The tool chuck 50 is operable to selectively engage and disengage a tool 52 from a tool holder 54. The tool chuck 50 is described in greater detail below. The tool holder 54 is attached to the support structure 24. As shown, the tool holder 54 is attached to the upper portion 28 of the support structure 24. The tool holder 54 is moveable relative to the support structure 24 along the X axis 32. More specifically, the tool holder 54 is moveable relative to the chuck holder 42 along the X axis 32. The tool holder 54 may be attached to the support structure 24 in any suitable manner that provides for or allows movement of the tool holder 54 relative to the support structure 24 along the X axis 32. For example, the tool holder 54 may be attached to the support structure 24 via one or more rails, rollers, etc. The specific manner in which the tool holder 54 is attached to the support structure 24 is not pertinent to the teachings of this disclosure, and are therefore not described in detail herein.

A tool holder drive system (not shown) is connected to the tool holder 54, and is operable to move the tool holder 54 back and forth along the X axis 32. The tool holder drive system may include any system capable of moving the tool holder 54 back and forth along the X axis 32, relative to the support structure 24. The tool holder drive system may include, but is not limited to, an electric motor, hydraulics, pneumatics, etc. The specific type and configuration of the tool holder drive system are not pertinent to the teachings of this disclosure, and are therefore not described in detail herein. The tool holder 54 and the tool holder drive system may include any parts 22, connections, linkages, etc., necessary to attach and move the tool holder 54 relative to the support structure 24, whether specifically mentioned herein or not.

Figure 2:
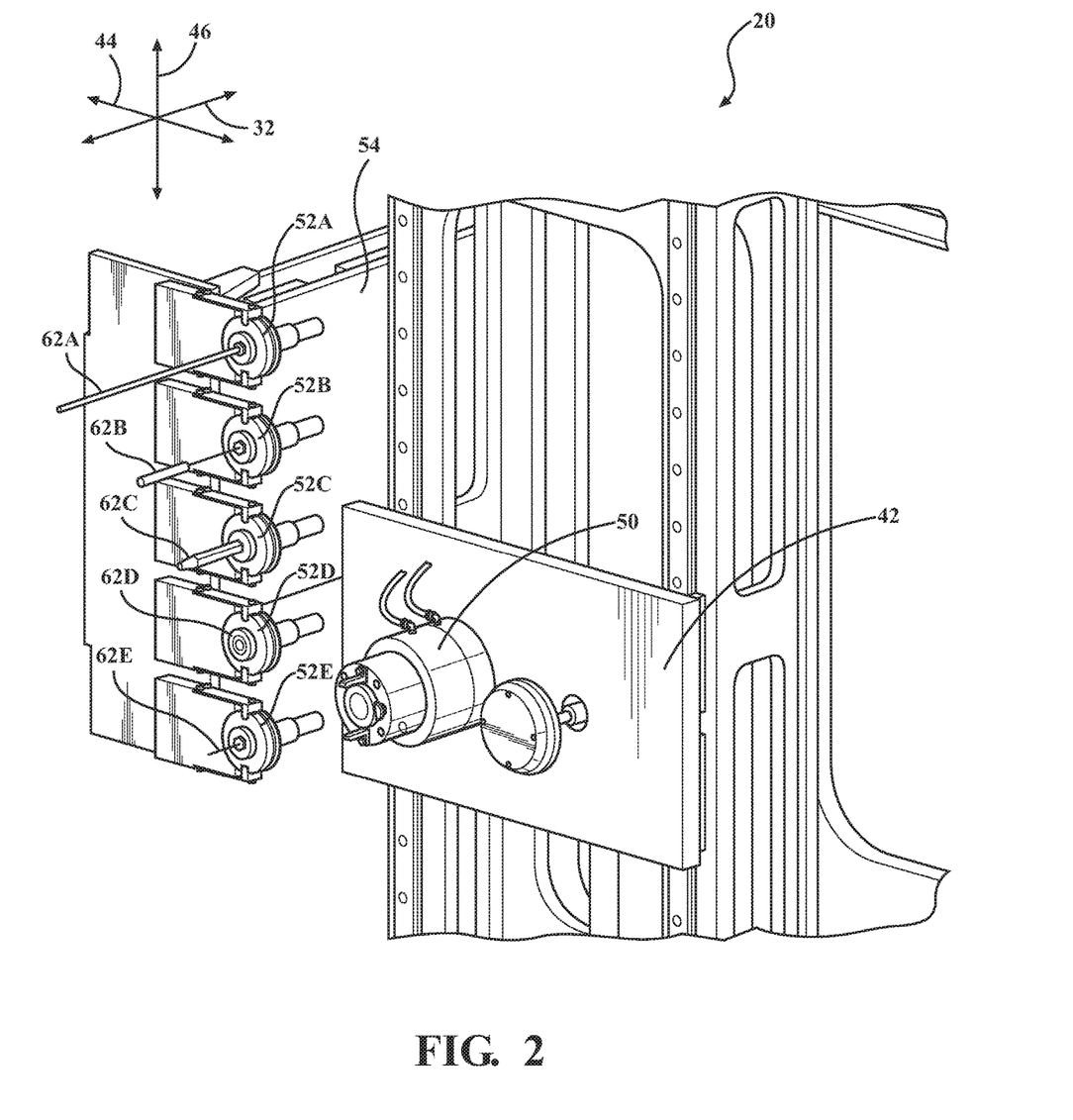
FIG. 2 is a schematic perspective view of a chuck holder of the part cleaning machine positioned to receive a tool from a tool holder of the part cleaning machine.

The tool holder 54 is configured to support a plurality of tools 52. As shown in FIGS. 1 and 2, the tool holder 54 is configured to support six individual tools 52, a first tool 52A, a second tool 52B, a third tool 52C, a fourth tool 52D, and a fifth tool 52E. The plurality of tools are referred to collectively herein by the reference numeral 52, and are referred to herein and specifically shown in the FIGS. by their respective reference numerals 52A, 52B, 52C, 52D, and 52E. The tools 52 are releasably attached to the tool holder 54 for selective attachment to the tool chuck 50, described in detail below. It should be appreciated that the tool holder 54 may be configured to hold more or less then the exemplary six different tools 52 shown in the FIGS. and described herein. Furthermore, it should be appreciated that the tool 52 cleaning machine may also be configured to have multiple tool holders 54, attached to different locations on the support structure 24, to provide a greater number of available tools 52.

Figure 3:
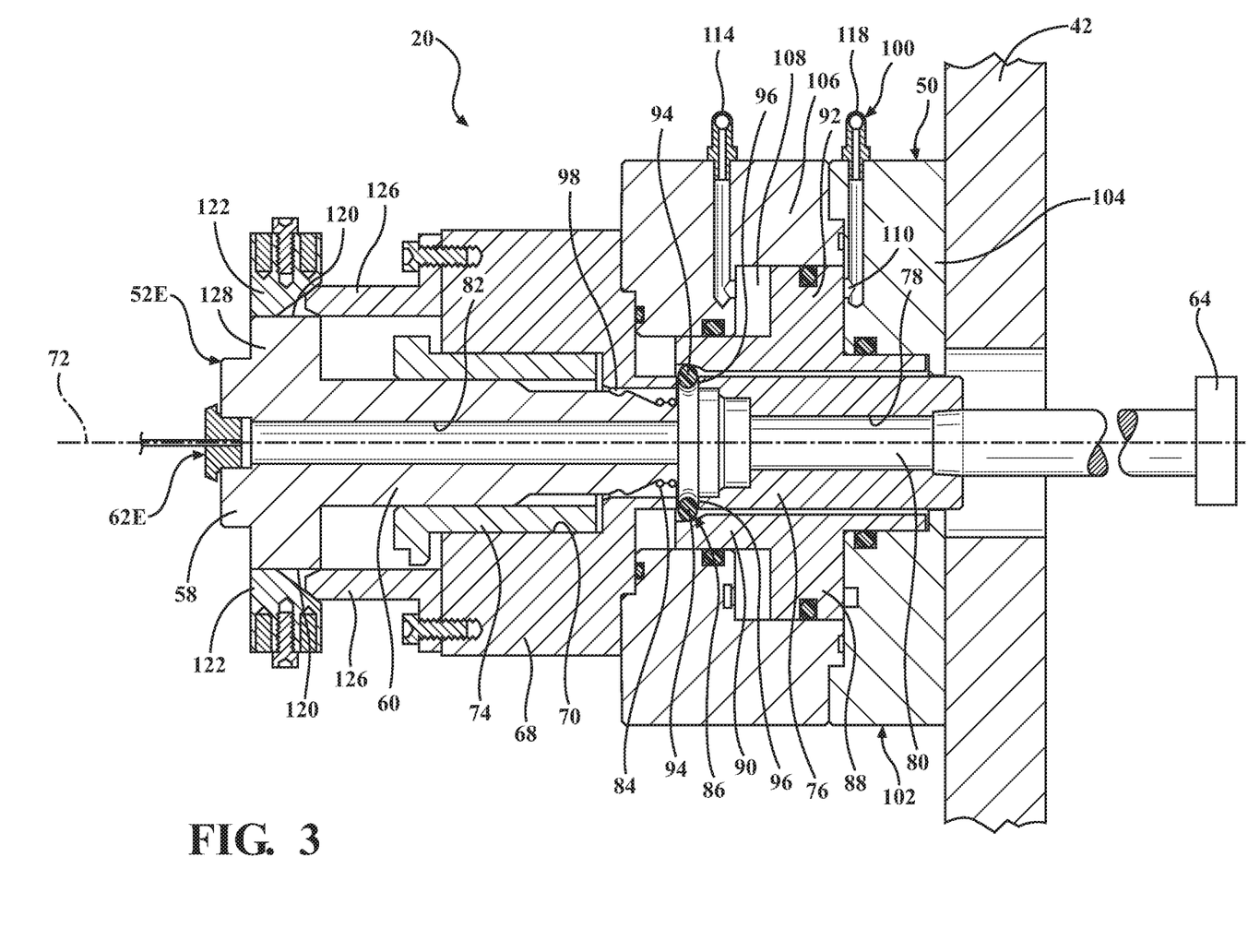
FIG. 3 is a schematic cross sectional view of the tool partially engaged by a tool chuck of the chuck holder.
Figure 4:
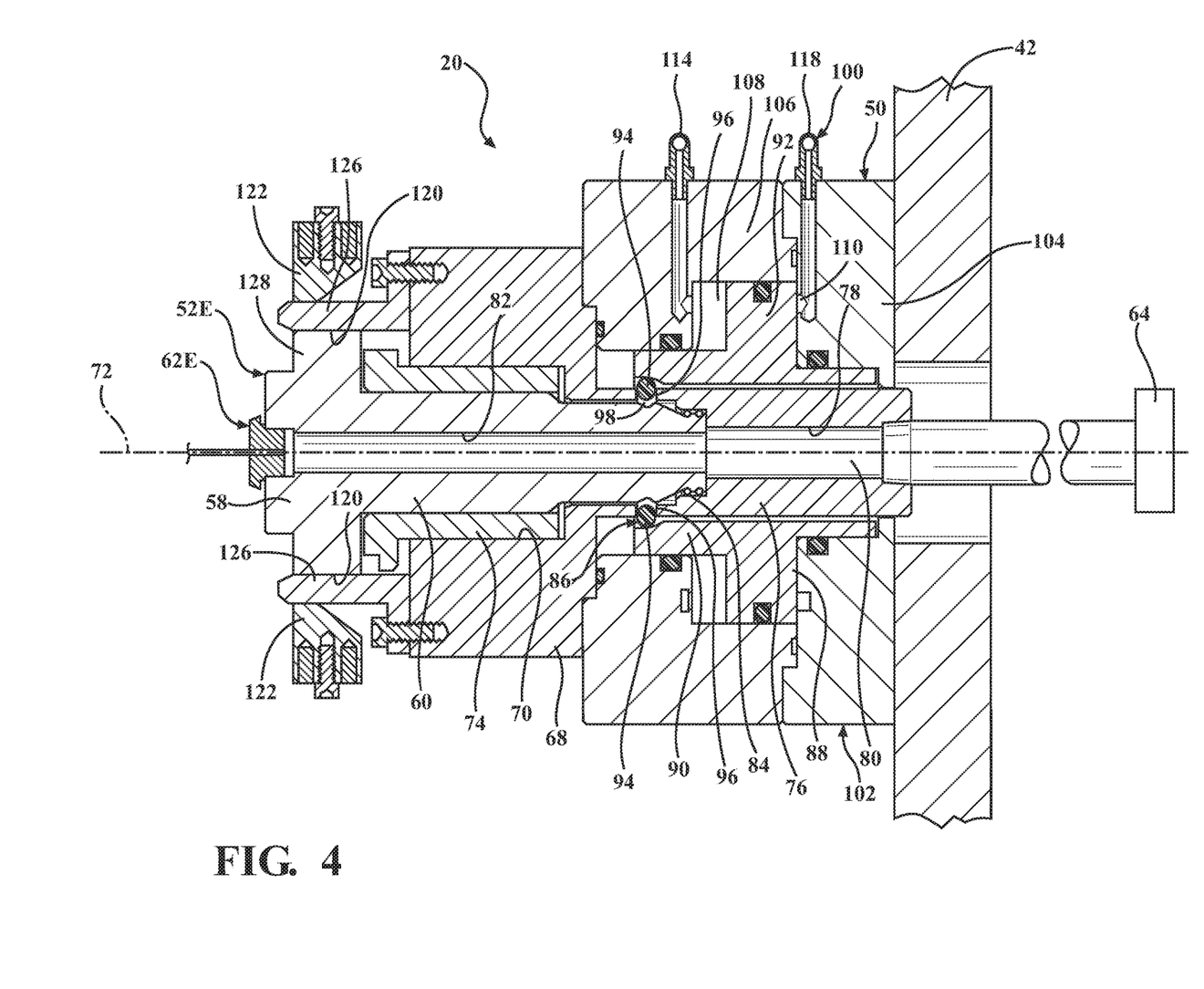
FIG. 4 is a schematic cross sectional view of the tool fully engaged by the tool chuck, with a locking mechanism of the tool chuck in a release position.
Figure 5:
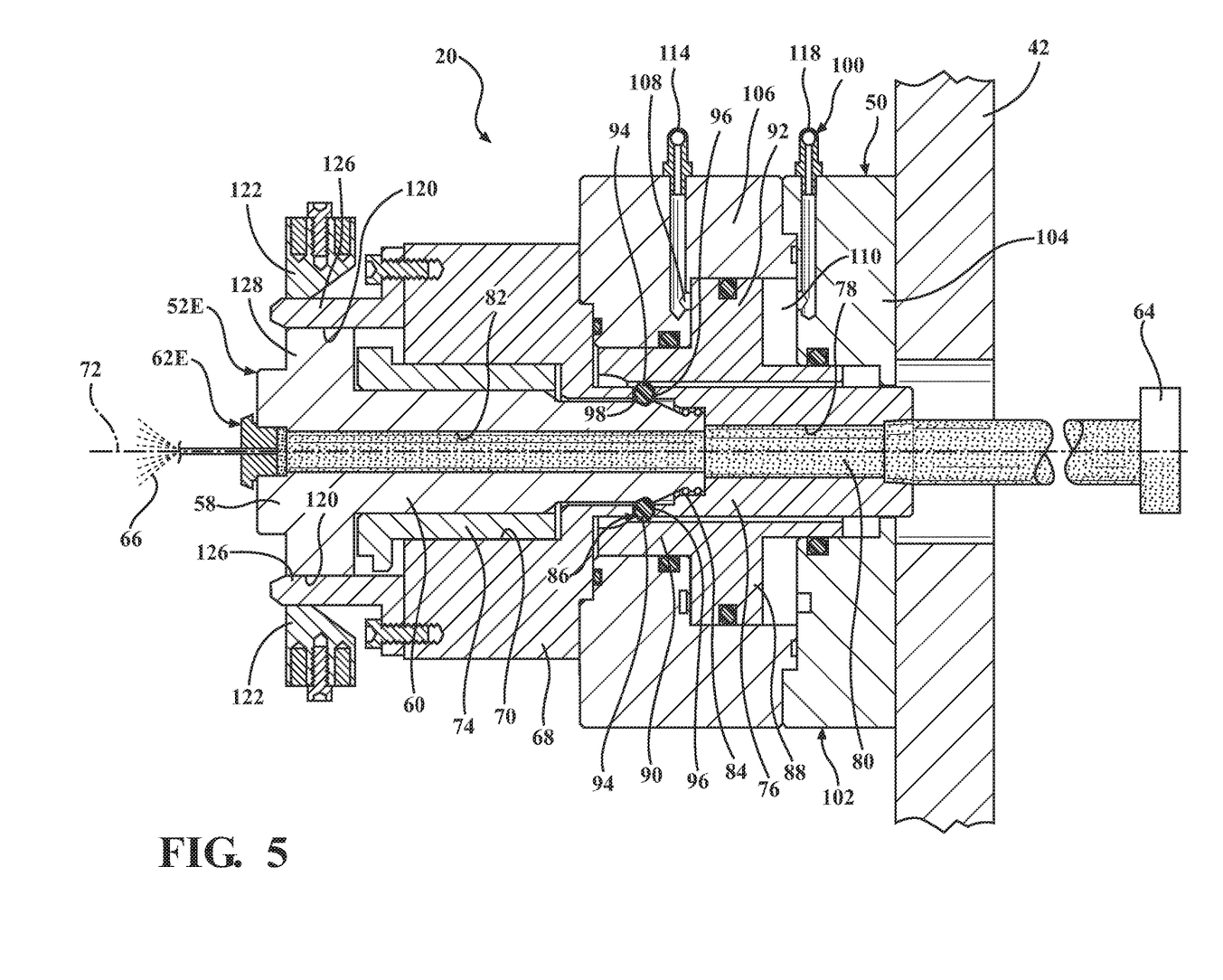
FIG. 5 is a schematic cross sectional view of the tool fully engaged by the tool chuck, with the locking mechanism of the tool chuck in a locking position.

Referring to FIGS. 3-5, each of the tools 52 includes a tool base 58 having a male portion 60. Additionally, referring to FIGS. 1 and 2, each of the tools 52 includes a specific tool attachment 62 (best shown in FIG. 2) attached to the tool base 58 that is configured to perform a specific cleaning operation. For example, referring to FIGS. 1 and 2, a first attachment 62A, a second attachment 62B, a third attachment 62C, a fourth attachment 62D, and a fifth attachment 62E are generally shown. The plurality of tool attachments are referred to collectively herein by the reference numeral 62, and are referred to herein and specifically shown in the FIGS. by their respective reference numerals 62A, 62B, 62C, 62D, and 62E. As noted above, each of the tools 52 may include a different tool attachment 62. Alternatively, one or more of the available tools 52 may be identical to another, so that the part cleaning machine 20 has a back-up or replacement tool 52 available should one tool 52 fail or wear out. The specific tool attachments 62 may include, but are not limited to a deburring tool, a washing tool, a flushing tool, a probing tool, a brushing tool, one or more different nozzles, etc. The specific type and configuration of tool attachments 62 and their respective operation are not pertinent to the teachings of this disclosure, and are therefore not described in detail herein.

Referring to FIG. 1, the part cleaning machine 20 includes a cleaning fluid source 64 that is disposed in fluid communication with the tool chuck 50. The cleaning fluid source 64 is operable to provide a cleaning fluid 66 to the tool chuck 50. The cleaning fluid source 64 may include any equipment necessary to supply the fluid to the chuck, including all pumps, lines, connections, fittings, tanks, etc. The cleaning fluid 66 may include any fluid necessary to perform a specific cleaning operation. For example, the cleaning fluid 66 may include, but is not limited to, water, air, solvents, degreasers, etc. Depending upon the specific cleaning operation being performed, the specific tool attachment 62 may receive the cleaning fluid 66 from the tool chuck 50, and dispense the cleaning fluid 66 onto the part 22 as part 22 of the cleaning operation. Accordingly, at least one of the tools 52 and its respective tool attachment 62 is operable to receive the cleaning fluid 66 through the tool chuck 50 when attached to the tool chuck 50, and dispense the cleaning fluid 66 onto the part 22. It should be appreciated that the part cleaning machine 20 may include multiple different fluid cleaning sources, with each selectively providing a different cleaning fluid 66 to the tool chuck 50 as needed to perform a specific cleaning operation.

Referring to FIGS. 3-5, the tool chuck 50 includes a base portion 68, which defines a tool receiving bore 70 that is concentric with a central axis 72 of the tool chuck 50. The male portion 60 of the tool base 58 is sized to fit within the tool receiving bore 70. Accordingly, when the tool 52 is engaged by the tool chuck 50, the male portion 60 of the tool base 58 is disposed within the tool receiving bore 70. As shown in the FIGS., the base portion 68 of the tool chuck 50 includes a bushing 74, which defines the tool receiving bore 70. When the tool 52 is engaged by the tool chuck 50, the bushing 74 is therefore disposed between the base portion 68 of the tool chuck 50 and the male portion 60 of the tool 52. The male portion 60 of the tool base 58 is therefore supported by the bushing 74. However, it should be appreciated that the base portion 68 of the tool chuck 50 may be directly formed to define the tool receiving bore 70, such that the bushing 74 is not required.

Referring to FIGS. 3-5, the base portion 68 of the tool chuck 50 includes an elongated stem portion 76. The stem portion 76 has an inner annular surface 78 that defines a fluid supply bore 80. The fluid supply bore 80 is disposed in fluid communication with the tool receiving bore 70. Additionally, the fluid supply bore 80 is disposed in fluid communication with the cleaning fluid source 64, such that the cleaning fluid source 64 may supply the fluid supply bore 80 with the cleaning fluid 66. The male portion 60 of each respective one of the plurality of tools 52 may include an internal passage 82 in fluid communication with the fluid supply bore 80 when attached to the tool chuck 50. The male portion 60 of the tool base 58 of each respective tool 52 may further include a seal 84 for sealing against the inner annular surface 78 of the elongated stem portion 76. The cleaning fluid 66 may flow through the fluid supply bore 80 and the internal passage 82 of the tool 52, to the tool attachment 62 at the end of the tool base 58, whereby the tool attachment 62 dispenses the cleaning fluid 66 onto the part 22. The seal 84 seals the tool receiving bore 70 from the fluid supply so that the cleaning fluid 66 does not leak around the outer periphery of the male portion 60 of the tool base 58 and into the tool receiving bore 70.

Referring to FIGS. 3-5, the tool chuck 50 includes a locking mechanism 86 that is operable to secure a selected one of the tools 52 relative to the tool chuck 50, and release the selected one of the tools 52 from the tool chuck 50. The locking mechanism 86 may be configured in any suitable manner. Referring to the exemplary embodiment of the tools 52 and the tool chuck 50 shown in the FIGS., the tool chuck 50 includes a collar piston 88 that is slideably disposed about the elongated stem portion 76 of the base portion 68 of the tool chuck 50. The collar piston 88 is moveable along the central axis 72, between a locking position, shown in FIG. 5, and a release position, shown in FIGS. 3 and 4. The collar piston 88 is configured to include a tubular portion 90 disposed about the stem portion 76, and a flange 92 that extends radially outward from the tubular portion 90, away from the central axis 72.

The tool chuck 50 includes at least one detent ball 94 disposed within a pocket 96 defined by the elongated stem portion 76, between the collar piston 88 and the elongated stem portion 76. Preferably, the tool chuck 50 includes a plurality of detent balls 94, with each detent ball 94 disposed within a respective pocket 96. The pocket 96 is sized to support the detent ball 94, such that a portion of the detent ball 94 may extend into the tool receiving bore 70, but the entire detent ball 94 is unable to pass through the pocket 96 into the tool receiving bore 70. As such, the detent ball 94 is seated within the pocket 96, but is free to move radially outward away from the central axis 72 when not secured in position by the collar piston 88.

The male portion 60 of each respective one of the plurality of tools 52 includes a recess 98 shaped to engage the detent ball 94. The recess 98 may include, for example, and annular groove extending around a circumference of the male portion 60 of the tool base 58. When the collar piston 88 is disposed in the release position, the detent ball 94 is moveable in a radial direction relative to the central axis 72, out of interlocking engagement with the recess 98 in the male portion 60 of the tool 52, to permit the engagement or disengagement between the tool 52 and the tool chuck 50. The collar piston 88 is configured to prevent the complete dislodgement of the detent ball 94 from the pocket 96 when the collar piston 88 is disposed in the release position. When the collar piston 88 is disposed in the locking position, the detent ball 94 is partially disposed within the recess 98 of the male portion 60 of a respective tool 52, in interlocking engagement between the male portion 60 of the respective tool 52 and the collar piston 88, and secured against radial movement relative to the central axis 72 by the collar piston 88. The interference between the detent ball 94 and the recess 98 prevents axial movement of the tool 52 along the central axis 72, thereby securing the tool 52 to the tool chuck 50.

Referring to FIGS. 3-5, the tool chuck 50 includes an actuating system 100 that is connected to the collar piston 88. The actuating system 100 is operable to move the collar piston 88 along the central axis 72. The actuating system 100 may include any system capable of moving the collar piston 88 axially along the central axis 72, between the locked position and the release position. As shown in the exemplary embodiment of the part cleaning machine 20 and described herein, the tool chuck 50 includes a collar 102 disposed about the collar piston 88. The collar 102 includes an inner collar portion 104 and an outer collar portion 106. The inner collar portion 104 and the outer collar portion 106 cooperate to define a first fluid chamber 108 and a second fluid chamber 110 that are disposed on opposing axial sides of the flange 92 of the collar piston 88. As such, the actuating system 100 includes the first fluid chamber 108 disposed on a first side of the collar piston 88, and connected to a first fluid source 114, and the second fluid chamber 110 disposed on a second side of the collar piston 88, and connected to a second fluid source 118. A higher fluid pressure in the first fluid chamber 108 relative to the second fluid chamber 110 biases the collar piston 88 in a first direction along the central axis 72 into the release position. A higher fluid pressure in the second fluid chamber 110 relative to the first fluid chamber 108 biases the collar piston 88 in a second direction along the central axis 72 into the locking position. The fluid pressure in the first fluid chamber 108 and the second fluid chamber 110 may be provided by, for example, an air pressure source or hydraulic pressure source. It should be appreciated that the locking mechanism 86 and the actuating system 100 may be configured differently than shown and described herein. In another exemplary embodiment, for example, the collar piston 88 may be actuated by an electric solenoid, or other similar device. Accordingly, the locking mechanism 86 and the actuating system 100 should not be limited to the exemplary embodiment shown and described herein.

Referring to FIGS. 3-7, the respective tool base 58 of each one of the plurality of tools 52 includes a notch 120. As shown in the FIGS. and as described herein, exemplary embodiment of each respective tool base 58 includes a pair of notches 120 disposed opposite each other, across the central axis 72 from each other. The tool holder 54 includes a plurality of holding pins 122, with each of the plurality of holding pins 122 moveably attached to the tool holder 54 and sized to fit within the notch 120 of a respective one of the tools 52 to secure the tool base 58 of the tool 52 to the tool holder 54. The holding pins 122 are attached to the tool holder 54 by a respective spring plate 124, best shown in FIGS. 6 and 7. The spring plate 124 biases their respective holding pin 122 toward the central axis 72, into an interlocking position with their respective notch 120.

Figure 6:
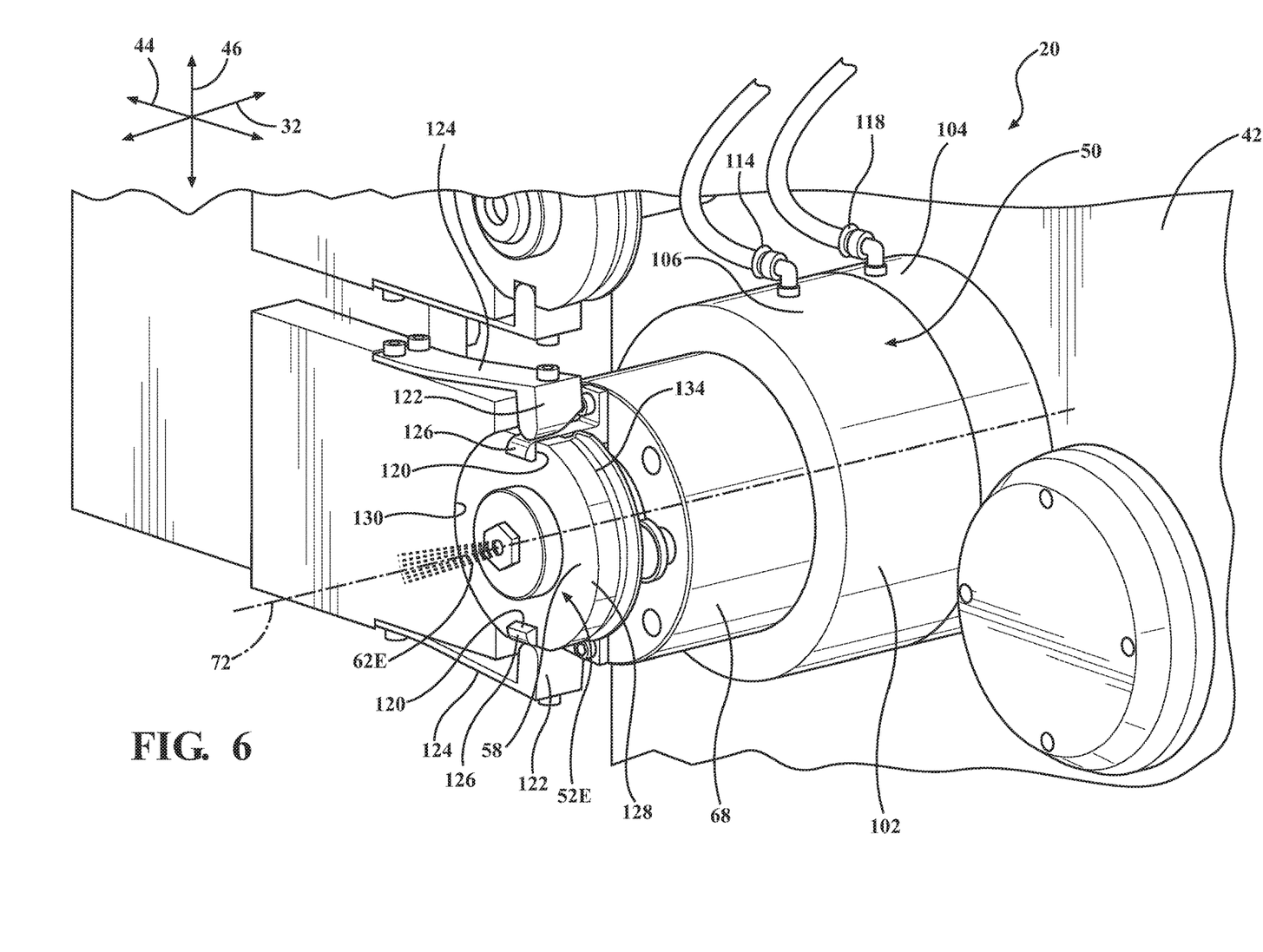
FIG. 6 is a schematic perspective view of the tool fully engaged by the tool chuck, prior to the tool being removed from the tool holder.
Figure 7:
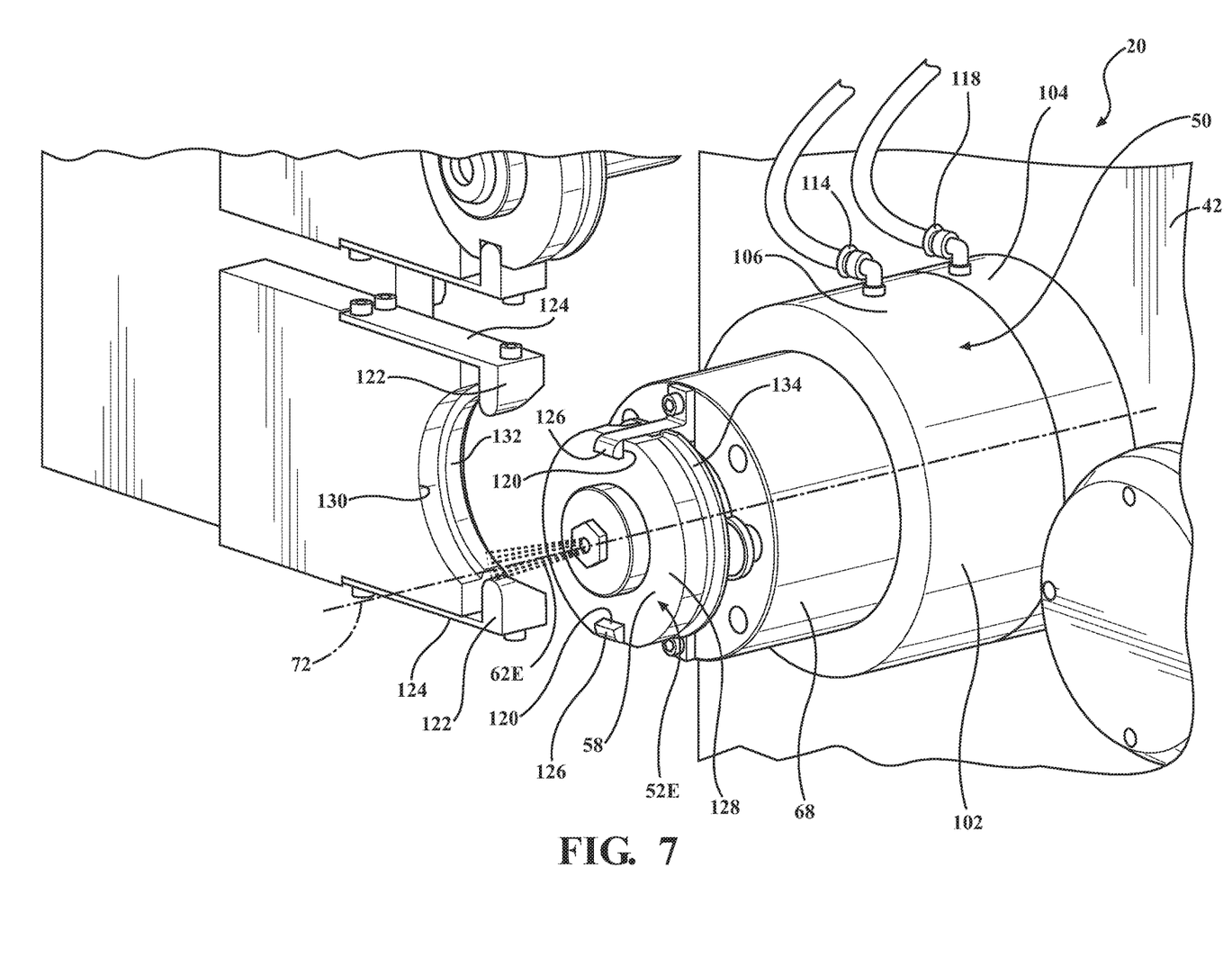
FIG. 7 is a schematic perspective view of the tool fully engaged by the tool chuck, after the tool has been removed from the tool holder by the chuck holder.

Referring to FIGS. 3-7, the base portion 68 of the tool chuck 50 includes a pair of projections 126, positioned to displace the holding pins 122 from their respective notches 120 of a selected tool 52, in response to axial movement of the tool holder 54 along the X axis 32 toward the chuck holder 42. The projections 126 slide into a respective notch 120, thereby displacing the holding pin 122 securing the tool base 58 to the tool holder 54, as the tool holder 54 moves along the X axis 32 toward the tool chuck 50. The tool base 58 of the selected tool 52 is released from the tool holder 54 and moveable with the tool chuck 50, once the projections 126 are fully disposed within their respective notches 120, and the holding pins 122 are fully dislodged. FIG. 3 shows the holding pins 122 disposed in their respective notches 120, with the projections 126 just contacting the holding pins 122. FIG. 4-6 show the holding pins 122 displaced from their respective notches 120, by one of the projections 126. FIG. 7 shows the tool 52 removed from the tool holder 54.

Referring to FIGS. 6 and 7, the tool base 58 of each respective tool 52 includes an annular body 128, with the tool holder 54 defining a semi-annular receiving pocket 130 for each respective tool 52. Each receiving pocket 130 is sized to fit the annular body 128 of one of the tools 52. Due to the annular body 128 of the tool base 58, as the tool 52 is moved laterally into the semi-annular receiving pocket 130 of the tool holder 54, the holding pins 122 will ride along the annular body 128 of the tool base 58 until positioned above or below one of the projections 126, such as shown in FIG. 6, whereby movement of the tool holder 54 along the X axis 32 away from the chuck holder 42 withdraws the projections 126 from the notches 120, and thereby allows the holding pins 122 to move into their respective notches 120 and secure the tool 52 within the semi-annular receiving pocket 130 of the tool holder 54. Additionally, as shown in FIG. 7, the semi-annular receiving pocket 130 and the annular body 128 of the tool 52 may include corresponding interlocking features, such as an annular lip 132 that mates with a semi-annular groove 134, to secure the tool 52 relative to the tool holder 54 during movement along the X axis 32.

Referring to FIG. 1, the tool 52 cleaning machine includes a machine controller 136. The machine controller 136 is operatively connected and capable of controlling the chuck holder 42, the tool chuck 50, the cleaning source, the tool holder 54, the cradle 30, and the part holder 38, as well as any other component of the part cleaning machine 20, whether specifically mentioned or not. The machine controller 136 controls the various operations of the part cleaning machine 20 in order to transfer a selected one of the tools 52 between the tool chuck 50 and the tool holder 54, and perform a desired cleaning operation.

The machine controller 136 may include a control module, such as but not limited to a computer or control unit, to control the operation of the components of the part cleaning machine 20. The machine controller 136 may include a computer and/or processor, and include all software, hardware, memory, algorithms, connections, sensors, etc., necessary to manage and control the operation of the part cleaning machine 20. As such, a method, described below, may be embodied as a program operable on the machine controller 136. It should be appreciated that the machine controller 136 may include any device capable of analyzing data from various sensors, comparing data, making the necessary decisions required to control the operation of the part cleaning machine 20, and executing the required tasks necessary to control the operation of the part cleaning machine 20.

The machine controller 136 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The machine controller 136 includes tangible, non-transitory memory on which are recorded computer-executable instructions, including a control algorithm. The processor of the controller is configured for executing the control algorithm. The control algorithm implements a method of operating the part cleaning machine 20, described in greater detail below. More specifically, the machine controller 136 is operable to select one of the plurality of tools 52 appropriate for performing a desired cleaning operation; transfer the selected one of the tools 52 from the tool holder 54 to the tool chuck 50 before starting the desired cleaning operation; position the selected one of the tools 52 in the pre-defined tool 52 cleaning position by moving the chuck holder 42 along at least one of the Y axis 44 and the Z axis 46 on the tool 52 positioning plane; position the part 22 in the pre-defined part 22 cleaning position by at least one of moving the cradle 30 along the X axis 32, rotating the cradle 30 about the first cradle axis 34, or rotating the part holder 38 about the second cradle axis 40; perform the desired cleaning operation on the part 22; and transfer the selected one of the plurality of tools 52 from the tool chuck 50 to the tool holder 54 after the desired cleaning operation is complete.

As described broadly above, the machine controller 136 executes a method of operating the part cleaning machine 20. The method includes providing the part cleaning machine 20, such as described in the exemplary embodiment above. Notably, the part cleaning machine 20 includes: the cradle 30, which is moveable along the X axis 32, and is rotatable about the first cradle axis 34, with the X axis 32 and the first cradle axis 34 being perpendicular to each other; the part holder 38, which is attached to the cradle 30, and is rotatable about the second cradle axis 40 relative to the cradle 30, with the first cradle axis 34 and the second cradle axis 40 being perpendicular to each other; the chuck holder 42, which is moveable along both the Y axis 44 and the Z axis 46, with the Y axis 44 and the Z axis 46 cooperating to form the tool 52 positioning plane that is perpendicular to the X axis 32; the tool chuck 50, which is attached to and moveable with the chuck holder 42, and operable to selective engage and disengage a selected one of the plurality of tools 52; the tool holder 54, which is moveable relative to the chuck holder 42 along the X axis 32; the plurality of tools 52, which are releasably attached to the tool holder 54 for selective attachment to the tool chuck 50, and the cleaning fluid source 64 for supplying the cleaning fluid 66 to the tool chuck 50.

The process of cleaning the part 22 begins by attaching the part 22 to the part holder 38. As noted above, the part 22 is removably attached to the part holder 38. The part 22 may be removably attached to the part holder 38 in any suitable manner. The specific manner in which the part 22 is attached to the part holder 38 depends on the specific configuration of the part 22, as well as the cleaning operation(s) to be performed, and the position of the part 22 required to perform the cleaning operation. For example, a robotic arm may maneuver the part 22 into position and secure the part 22 to the part holder 38. Alternatively, the part 22 may be manually loaded or attached to the part 22 loader.

The process further includes selecting one of the plurality of tools 52 for performing the desired cleaning operation. The machine controller 136 selects the appropriate tool based on the specific part 22 to be cleaned and the desired cleaning operation to be performed. As described above, the part cleaning machine 20 includes many tools 52, with each tool 52 including a specific tool attachment 62 for performing a specific cleaning operation. The specific cleaning operation will depend on the specific type and configuration of the part 22. The specific tool 52 required for performing the desired cleaning operation will depend on the configuration of the part 22 and the desired cleaning operation to be performed, i.e., flushing, brushing, deburring, etc.

Once the machine controller 136 has selected the appropriate tool 52 for the desired cleaning operation, the machine controller 136 then transfers the selected tool 52 from the tool holder 54 to the tool chuck 50. Transferring the selected tool 52 from the tool holder 54 to the tool chuck 50 includes moving the chuck holder 42 along at least one of the Y axis 44 and the Z axis 46 on the tool 52 positioning plane into a pre-defined tool 52 transfer position. Each of the plurality of tools 52 will have a corresponding tool 52 transfer position for the tool chuck 50. The specific tool 52 transfer position will therefore depend upon which tool 52 the machine controller 136 selects for the desired cleaning operation. Once the chuck holder 42 and the tool chuck 50 are positioned in the appropriate tool 52 transfer position for the selected tool 52, the machine controller 136 then moves the tool holder 54 along the X axis 32 and toward the chuck holder 42, until the tool chuck 50 engages the selected tool 52, whereby the selected tool 52 is automatically released from the tool holder 54. As described above, as the tool holder 54 moves toward the tool chuck 50, the projections 126 on the tool chuck 50 displace the holding pins 122 holding the selected tool 52 to the tool holder 54. Once the selected tool 52 has been engaged by the tool chuck 50, the machine controller 136 actuates the locking mechanism 86 to secure the selected tool 52 to the tool chuck 50. As described above, actuating the locking mechanism 86 includes moving the collar piston 88 from the release position into the locked position. Once the tool 52 is secured to the tool chuck 50 by the locking mechanism 86, the machine controller 136 may then move the tool holder 54 along the X axis 32 and away from the chuck holder 42, thereby moving the selected tool 52 away from and out of engagement with the tool holder 54.

Once the selected tool 52 is secured to the tool chuck 50, the machine controller 136 may position the selected tool 52 in a pre-defined tool 52 cleaning position, by moving the chuck holder 42 along at least one of a Y axis 44 and a Z axis 46 on the tool 52 positioning plane. The machine controller 136 may also position the part 22 in a pre-defined part 22 cleaning position by moving the cradle 30 along the X axis 32, rotating the cradle 30 about the first cradle axis 34, and/or rotating the part holder 38 about the second cradle axis 40. It should be appreciated that the part 22 cleaning position and tool 52 cleaning position may be fixed positions, or may alternatively be defined movement paths. For example, the part 22 cleaning position may present a feature of the part 22 in a fixed position relative to the tool 52 cleaning position, or the part 22 cleaning position may include a path along which the machine controller 136 moves the part 22 during the cleaning operation. Similarly, the tool 52 cleaning position may be a fixed position relative to the part 22 cleaning position, or may include a path along which the machine controller 136 moves the chuck holder 42 and thereby the tool 52 during the cleaning operation.

Once the machine controller 136 has positioned the selected tool 52 in the tool 52 cleaning position, and the part 22 in the part 22 cleaning position, the machine controller 136 then continues to perform or execute the desired cleaning operation on the part 22, using the selected tool 52. As described above, the desired cleaning operation may require the cleaning fluid 66. Accordingly, it should be appreciated that performing the desired cleaning operation may include supplying the tool chuck 50 with the cleaning fluid 66 from the cleaning fluid source 64, whereby the selected tool 52 dispenses the cleaning fluid 66 during the desired cleaning operation. It should be appreciated that the desired cleaning operation may therefore include directing the cleaning fluid 66 through the fluid supply bore 80 of the tool chuck 50 and the internal passage 82 of the selected tool 52.

After the desired cleaning operation is complete, the machine controller 136 may then move the part 22 away from the selected tool 52 in the pre-defined tool 52 cleaning position, by moving the cradle 30 along the X axis 32, rotating the cradle 30 about the first cradle axis 34, or rotating the part holder 38 about the second cradle axis 40. Once the selected tool 52 is free of the part 22, the machine controller 136 may then transfer the selected tool 52 from the tool chuck 50 to the tool holder 54. Transfer of the selected tool 52 from the tool chuck 50 to the tool holder 54 is similar to the procedure described above for transferring the selected tool 52 from the tool holder 54 to the tool chuck 50. Specifically, transferring the selected tool 52 from the tool chuck 50 to the tool holder 54 includes moving the chuck holder 42 laterally along the Y axis 44 on the tool 52 positioning plane into the pre-defined tool 52 transfer position for the selected tool 52. By moving the chuck holder 42 laterally into the appropriate tool 52 transfer position, the holding pins 122 engage the annular body 128 of the selected tool 52, and are thereby spread apart 22 as the selected tool 52 is moved into the appropriate tool 52 transfer position. Once the chuck holder 42 and the tool chuck 50 are positioned in the appropriate tool 52 transfer position for the selected tool 52, the machine controller 136 actuates the locking mechanism 86 to release the selected tool 52 from the tool chuck 50. As described above, actuating the locking mechanism 86 includes moving the collar piston 88 from the locking position into the release position. Once the selected tool 52 has been released from the tool chuck 50, the machine controller 136 then moves the tool holder 54 along the X axis 32 and away from the chuck holder 42, until the selected tool 52 completely disengages the tool chuck 50. As described above, as the tool holder 54 moves away from the tool chuck 50, the projections 126 on the tool chuck 50 withdraw from the notches 120 in the tool 52 body, thereby allowing the holding pins 122 to move into the notches 120 and secure the tool 52 relative to the tool holder 54. Furthermore, the interlocking features between the receiving pocket 130 and the annular body 128 of the tool base 58, e.g., the annular lip 132 and the semi-annular groove 134, engage each other to secure the tool 52 relative to the tool holder 54 as the tool holder 54 moves away from the tool chuck 50.

After the desired cleaning operation is complete and the selected tool 52 has been returned to the tool holder 54, the machine controller 136 may then continue with a second desired cleaning operation, using a second selected tool 52. It should be appreciated that the process of performing or executing the second desired cleaning operation with the second selected tool 52 is the same as described above, with the steps described above being repeated for a different one of the tools 52. It should be noted that the tool 52 transfer position will change to reflect the location of the second selected tool 52 on the tool holder 54.

Specifically, the machine controller 136 selects the second one of the tools 52 for performing the second desired cleaning operation. As noted above, the specific tool 52 will depend on the desired cleaning operation. The second desired tool 52 is then transferred to the tool chuck 50 from the tool holder 54 as described above, with the tool holder 54 and the tool chuck 50 moving into the appropriate second tool 52 transfer position associated with the selected second tool 52. The machine controller 136 then positions the selected second tool 52 in a second pre-defined tool 52 cleaning position, and positions the part 22 in a second pre-defined part 22 cleaning position, as described above. The machine controller 136 then executes the second desired cleaning operation on the part 22.

It should be appreciated that the part cleaning machine 20 may perform any number of different cleaning operations on the part 22, using any number of different tools 52 and tool attachments 62, without moving the part 22 to a different machine. Once all of the desired cleaning operations have been performed on the part 22, the part 22 may be released from the part holder 38, and the process is complete.

The detailed description and the drawings or FIGS. are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A part cleaning machine comprising:
 a support structure;
 a cradle attached to the support structure, wherein the cradle is moveable relative to the support structure along an X axis, and is rotatable relative to the support structure about a first cradle axis, with the X axis and the first cradle axis being perpendicular to each other;
 a part holder attached to the cradle, wherein the part holder is rotatable about a second cradle axis relative to the cradle, with the first cradle axis and the second cradle axis being perpendicular to each other;
 a chuck holder attached to the support structure, wherein the chuck holder is moveable relative to the support structure along both a Y axis and a Z axis, with the Y axis and the Z axis cooperating to form a tool positioning plane that is perpendicular to the X axis;
 a tool chuck attached to and moveable with the chuck holder;
 a tool holder attached to the support structure, wherein the tool holder is moveable relative to the chuck holder along the X axis;
 a plurality of tools releasably attached to the tool holder for selective attachment to the tool chuck; and
 a machine controller operatively connected to the chuck holder, the tool chuck, and the tool holder, wherein the machine controller is operable to control the chuck holder, the tool chuck, and the tool holder to transfer a selected one of the plurality of tools between the tool chuck and the tool holder.

2. The part cleaning machine set forth in claim 1, further comprising a cradle drive system connected to the cradle and operable to move the cradle along the X axis.

3. The part cleaning machine set forth in claim 1, further comprising a chuck drive system connected to the chuck holder and operable to move the chuck holder along both the Y axis and the Z axis.

4. The part cleaning machine set forth in claim 1, further comprising a cleaning fluid source in fluid communication with the tool chuck, and operable to provide a cleaning fluid to the tool chuck.

5. The part cleaning machine set forth in claim 4, wherein at least one of the plurality of tools is operable to receive the cleaning fluid through the tool chuck when attached to the tool chuck, and dispense the cleaning fluid.

6. The part cleaning machine set forth in claim 1, wherein the tool chuck includes a locking mechanism operable to secure the selected one of the plurality of tools relative to the tool chuck, and release the selected one of the plurality of tools from the tool chuck.

7. The part cleaning machine set forth in claim 6, wherein the locking mechanism includes an actuating system connected to and operatively controlled by the machine controller.

8. The part cleaning machine set forth in claim 1, wherein the Y axis and the first cradle axis are parallel with each other.

9. The part cleaning machine set forth in claim 1, wherein the part holder is configured for releasable attachment to a part, and wherein the machine controller is operable to:
 transfer the selected one of the plurality of tools from the tool holder to the tool chuck;
 move the tool holder along at least one of the Y axis and the Z axis on the tool position plane;
 move the cradle along the X axis;
 rotate the cradle about the first cradle axis; and
 rotate the part holder about the second cradle axis to present the selected tool at a desired location relative to the part for executing a cleaning operation on the part.

10. The part cleaning machine set forth in claim 1, wherein the tool chuck includes a base portion defining a tool receiving bore concentric with a central axis.

11. The part cleaning machine set forth in claim 10, wherein each of the plurality of tools includes a tool base having a male portion sized to fit within the tool receiving bore.

12. The part cleaning machine set forth in claim 11, wherein the tool chuck includes a bushing disposed within the tool receiving bore, between the base portion of the tool chuck and the male portion of a respective one of the plurality of tools.

13. The part cleaning machine set forth in claim 11, wherein the base portion includes an elongated stem portion having an inner annular surface defining a fluid supply bore disposed in fluid communication with the tool receiving bore.

14. The part cleaning machine set forth in claim 13, wherein the male portion of each respective one of the plurality of tools includes a respective seal for sealing against the inner annular surface of the elongated stem portion.

15. The part cleaning machine set forth in claim 14, wherein the male portion of at least one of the plurality of tools includes an internal passage in fluid communication with the fluid supply bore when attached to the tool chuck.

16. The part cleaning machine set forth in claim 11, wherein each of the plurality of tools includes a tool attachment attached to the tool base.

17. The part cleaning machine set forth in claim 13, wherein the tool chuck includes a collar piston slideably disposed about the elongated stem portion and moveable along the central axis between a locking position and a release position.

18. The part cleaning machine set forth in claim 17, wherein the tool chuck includes at least one detent ball disposed within a pocket defined by the elongated stem portion, between the collar piston and the elongated stem portion.

19. The part cleaning machine set forth in claim 18, wherein the male portion of each respective one of the plurality of tools includes a recess.

20. The part cleaning machine set forth in claim 19, wherein the at least one detent ball is disposed within the recess of a respective one of the plurality of tools, in interlocking engagement between the male portion of the respective one of the plurality of tools and the collar piston, and secured against radial movement relative to the central axis, when the collar piston is disposed in the locking position.

21. The part cleaning machine set forth in claim 19, wherein the at least one detent ball is moveable in a radial direction relative to the central axis, out of interlocking engagement between the male portion of the respective one of the plurality of tools and the collar piston, when the collar piston is disposed in the release position, to permit removal of the male portion from the tool chuck.

22. The part cleaning machine set forth in claim 17, wherein the tool chuck includes an actuating system connected to the collar piston and operable to move the collar piston along the central axis.

23. The part cleaning machine set forth in claim 22, wherein the actuating system includes a first fluid chamber disposed on a first side of the collar piston and connected to a first fluid source, and a second fluid chamber disposed on a second side of the collar piston and connected to a second fluid source, wherein a higher fluid pressure in the first fluid chamber relative to the second fluid chamber biases the collar piston in a first direction along the central axis into the release position, and wherein a higher fluid pressure in the second fluid chamber relative to the first fluid chamber biases the collar piston in a second direction along the central axis into the locking position.

24. The part cleaning machine set forth in claim 23, wherein the tool chuck includes a collar disposed about the collar piston, and defining the first fluid chamber and the second fluid chamber.

25. The part cleaning machine set forth in claim 24, wherein the collar includes an inner collar portion and an outer collar portion.

26. The part cleaning machine set forth in claim 11, wherein the respective tool base of each one of the plurality of tools includes a notch.

27. The part cleaning machine set forth in claim 26, wherein the tool holder includes a plurality of holding pins, with each of the plurality of holding pins moveably attached to the tool holder and sized to fit within the notch of a respective one of the plurality of tools to secure the tool base of the respective one of the plurality of tools to the tool holder.

28. The part cleaning machine set forth in claim 27, wherein the base portion of the tool chuck includes a projection positioned to displace a respective one of the plurality of holding pins from the notch of a respective one of the plurality of tools in response to movement of the tool holder along the X axis toward the chuck holder, such that the tool base of the respective one of the plurality of tools is released from the tool holder and moveable with the tool chuck.

* * * * *